US012783375B2

(12) United States Patent
Chen et al.

(10) Patent No.: US 12,783,375 B2
(45) Date of Patent: Nov. 3, 2026

(54) PROGNOSTIC AND HEALTH MANAGEMENT SYSTEM FOR SYSTEM MANAGEMENT AND METHOD THEREOF

(71) Applicant: AUO Corporation, Hsin-Chu (TW)

(72) Inventors: Meng-Jen Chen, Hsin-Chu (TW); Yen-Jen Chen, Hsin-Chu (TW); Yuan-Hao Wen, Hsin-Chu (TW); Ying-Hao Pan, Hsin-Chu (TW)

(73) Assignee: AUO CORPORATION, Hsin-Chu (TW)

( * ) Notice: Subject to any disclaimer, the term of this patent is extended or adjusted under 35 U.S.C. 154(b) by 1121 days.

(21) Appl. No.: 17/862,574

(22) Filed: Jul. 12, 2022

(65) Prior Publication Data

US 2023/0022100 A1 Jan. 26, 2023

(30) Foreign Application Priority Data

Jul. 26, 2021 (TW) ................................ 110127415

(51) Int. Cl.
*G06F 11/27* (2006.01)
*G06N 3/08* (2023.01)

(52) U.S. Cl.
CPC ............... *G06F 11/27* (2013.01); *G06N 3/08* (2013.01)

(58) Field of Classification Search
CPC ................................. G06F 11/27; G06N 3/08
See application file for complete search history.

(56) References Cited

U.S. PATENT DOCUMENTS

| | | | | |
|---|---|---|---|---|
| 10,789,513 | B2 | 9/2020 | Kuo | |
| 2010/0169250 | A1* | 7/2010 | Schmidtler | G06N 20/00 706/46 |

(Continued)

FOREIGN PATENT DOCUMENTS

| | | | |
|---|---|---|---|
| CN | 107844799 | A | 3/2018 |
| CN | 108062572 | A | 5/2018 |

(Continued)

OTHER PUBLICATIONS

C. Peng et al., "Review of Key Technologies and Progress in Industrial Equipment Health Management," in IEEE Access, vol. 8, pp. 151764-151776, 2020, doi: 10.1109/ACCESS.2020.3017626. (Year: 2020).*

(Continued)

*Primary Examiner* — Mariela Reyes
(74) *Attorney, Agent, or Firm* — WPAT, PC

(57) ABSTRACT

A machine-learning-based prognostic and health management system comprises a machine sensor, an instruction receiver, a processor, and an annunciator. The machine sensor is configured to dynamically receive data of a machine under test associated with operations of the machine under test. The instruction receiver is configured to dynamically receive a model-assigning command. The processor is configured to dynamically apply a damage alert machine-learning model corresponding to the model-assigning command for processing the data of the machine under test to predict an anomaly probability of an anomaly occurrence of the machine under test. The processor also dynamically generates, according to the anomaly probability, a damage possibility warning on the machine under test, and determine whether to keep the machine under test running or not.

17 Claims, 6 Drawing Sheets

(56) References Cited

U.S. PATENT DOCUMENTS

| | | | | |
|---|---|---|---|---|
| 2014/0156575 | A1* | 6/2014 | Sainath | G06N 7/01 706/16 |
| 2020/0264335 | A1 | 8/2020 | Bhatia | |
| 2021/0034960 | A1* | 2/2021 | Khapali | G06N 3/08 |

FOREIGN PATENT DOCUMENTS

| | | | | |
|---|---|---|---|---|
| CN | 111597948 | A | 8/2020 | |
| CN | 112964469 | A | 6/2021 | |
| EP | 3836037 | A1 * | 6/2021 | G06N 20/20 |

OTHER PUBLICATIONS

P. Pandey, A. Chakraborty and G. C. Nandi, "Efficient Neural Network Based Principal Component Analysis Algorithm," 2018 Conference on Information and Communication Technology (CICT), Jabalpur, India, 2018, pp. 1-5, doi: 10.1109/INFOCOMTECH.2018.8722348. (Year: 2018).*

Pankaj Goel, Aniruddha Datta, M. Sam Mannan, Industrial alarm systems: Challenges and opportunities, Journal of Loss Prevention in the Process Industries, vol. 50, Part A, 2017, pp. 23-36, ISSN 0950-4230 (Year: 2017).*

* cited by examiner

PROGNOSTIC AND HEALTH MANAGEMENT SYSTEM FOR SYSTEM MANAGEMENT AND METHOD THEREOF

CROSS-REFERENCE TO RELATED APPLICATIONS

This application claims the priority benefit of Taiwan Patent Application serial no. 110127415, filed Jul. 26, 2021. The entirety of the mentioned above patent application is hereby incorporated by reference herein and made a part of this specification.

FIELD OF THE INVENTION

The disclosure generally relates to a prognostic and health management (PHM) system and methods thereof for system management; in particular, a prognostic and health management system and methods thereof dynamically applying a plurality of damage alert machine-learning models according and in response to the different conditions facing the system.

BACKGROUND OF THE INVENTION

The core of a prognostic and health management mechanism is the use of various combinations of advanced sensors with various algorithms and artificial intelligence models to predict, monitor and manage the operating status of various systems to ensure the smooth operation of independent self-testing mechanisms and self-maintenance mechanisms. More specifically, a prognostic and health management mechanism monitors the environment parameters detected by the various systems in real time to monitor the operating status of systems or equipment, or even the range and period of frequent failure. A prognostic and health management mechanism can further monitor and analyze the data to predict possible failures occurring in the future to greatly improve the operation efficiency and stability of the system or equipment. Because of these characteristics, a prognostic and health management mechanism generally has the ability of independent failure detection and isolation, failure determination, failure prediction, health management, and life cycle tracking and management of individual components included in the system or equipment.

However, when trying to introduce the mechanisms of prognostic and health management for system and equipment management, ordinary enterprises will find it quite time-consuming and labor-consuming to go from zero to implementation. More specifically, the implementation of the prognostic and health management mechanism will include the following stages: installing sensors to collect data to establish a database; data preprocessing and graph conversion; classifying the definition of normal and abnormal graphic features; convolution and pooling architecture processing of convolutional neural network (CNN); full connection layer architecture and deep learning of deep neural network (DNN); testing and diagnosis of new data; establishment of models; online detection of the transfer of equipment.

During the establishment of these mechanisms mentioned above, at the same time, engineers need to be trained to deal with program writing and maintenance. Under the premise of ordinary recruitment and related training, the estimated time cost of personnel training and system establishment can include the following, which are not easy to pipeline: three months of Python language training with more than three years of practical experience in the field, eight hours of sensor arrangement, one week of sensor data acquisition, one month of data preprocessing and conversion, one month of feature extraction, one month of model establishment, two months of model training, one month of model prediction, one month of data analysis, one month planning of the architecture of convolutional neural network, three months of VC++ language training, three months of programmable logic controller arrangement and operation, and three months of artificial intelligence related courses. Among the above-mentioned costs of time consumption and result control, there are several parts that aim at training engineers, and the results of which are the most unpredictable and time-consuming. It is because artificial intelligence technologies have grown and advanced over the years, which makes training costs increase rapidly with time.

Refer to FIG. 1. FIG. 1 is a schematic flow chart of the implementation of a prognostic and health management mechanism in the prior art. The main principle of FIG. 1 is performing diagnose and correction on the system/device (hereinafter referred to as "system", but it still can be replaced by "device") by confirming whether the actuation between the current data and the current system is normal. In the scenario of FIG. 1, it is assumed that the system monitored by the prognostic and health management mechanism will continually update new input data and continually be confirmed whether it operates normally.

First, in step 102, a starting point will be determined to determine whether the currently received input data will trigger any actuation state of the system. If the currently received input data will not trigger any action state of the system, execute step 104 to delete the currently received input data to abandon the monitoring of the data, and go back to step 102 again to determine whether the next received input data will trigger any action state of the system. If the currently received input data triggers any actuation state of the system in step 102, proceed to step 106.

In step 106, a detailed actuation classification will be made for the current input data. Step 108 will confirm whether the actuation classification corresponds to a complete actuation of the system. If step 108 confirms that it does not correspond to a complete actuation of the system, the current input data is temporarily stored in step 110, and it will wait in step 106 for the next input data related to triggering the system to complete the first cycle. In step 108, if the next input data is determined to not correspond to the complete actuation of the system either, the next input data will merge with the input data temporarily stored in the first cycle in step 110, and the process will further wait for another data in step 106 to form a second cycle. Finally, the data will continue to merge with new input data until it is determined in step 108 that it is related to a complete actuation of the system. Accordingly, a final merged actuation data will be generated, and the process will proceed to step 112.

In step 112, the mechanism of the diagnostic and health management determines, by convolution neural network, whether the final merged actuation data will cause a complete abnormal actuation of the system. If the final merged actuation data is determined to not cause an abnormal actuation, a diagnostic data representing normal actuation will be outputted. If the final merged actuation data is determined to cause an abnormal actuation, a diagnostic data representing abnormal actuation will be outputted, and the system will be forced to perform further diagnosis or repair operations. Regardless of the diagnosis result in step 112, the prognostic and health management mechanism will temporarily store the non-actuating data accumulated so far, and merge them with the new input data and the derived diagnostic data as historical analysis and diagnosis record.

However, the conventional diagnostic and health management mechanism mentioned above has its disadvantages. More specifically, in practice, the operation of the prognostic and health management mechanism will quickly accumulate a large amount of input data and massive diagnostic data derived from the large amount of input data. Therefore, it is usually impossible for the conventional mechanism to completely merge the input data and diagnostic data immediately. Instead, it will merge the large amount of data once a day on a daily basis and temporarily store the data in a temporary memory database before merging. However, if the amount of data accumulated per unit time (day) is too large, the complexity of data merging will also increase sharply to the degree that the data cannot be processed immediately. Ultimately, the conventional mechanism will not be able to correctly perform the function of early warning of anomaly because of insufficient time for real-time record.

SUMMARY OF THE INVENTION

The disclosure provides a machine-learning-based prognostic and health management system and methods thereof to solve the shortcoming of the prior arts.

In an embodiment, a machine-learning-based prognostic and health management method comprises: dynamically receiving data of a machine under test associated with operations of the machine under test; dynamically receiving a model-assigning command; dynamically applying a damage alert machine-learning model corresponding to the model-assigning command for processing the data of the machine under test to predict an anomaly probability of an anomaly occurrence of the machine under test; and dynamically generating, according to the anomaly probability, a damage possibility warning on the machine under test, and determining whether to keep the machine under test running or not, wherein the damage alert machine-learning model comprise a complete-life-cycle machine-training model, a failure-free machine-training model and a value-to-image machine-training model; wherein the complete-life-cycle machine-training model is based on a complete life cycle operation record of at least one machine, the failure-free machine-training model is based on an operation record of at least one failure-free machine, and the value-to-image machine-training model is based analysis on images converted from values stored in an operation record of at least one machine.

In an embodiment, the deep neural network model comprises a low-rank factorization deep neural network model.

In an embodiment, the method comprises: applying the logistic regression and logical model to perform a low-rank factorization to classify the data of the machine under test by applying a regression curve; applying deep neural network to establish a deep network model; and applying the deep network model to determine current status of the machine under test and the corresponding anomaly probability.

In an embodiment, the failure-free machine-training model comprises support vector data description model.

In an embodiment, the method comprises: performing frequency domain and time domain operations on the data of the machine under test based on a frequency feature and a temporal feature of the data of the machine under test; and applying support vector data description to the data of the machine under test with the frequency domain and time domain operations performed to establish an optimization model to classify the anomaly probability in different data points of the data of the machine under test.

In an embodiment, the value-to-image machine-training model comprises convolutional neural network model.

In an embodiment, the method comprises: performing processes of image data filtering and cutting and anomaly data generating on the data of the machine under test to convert the data of the machine under test to an image data; extracting eigenvalues of the image data according to an image feature of the image data to optimize parameters of the image data; and analyzing the image data having the optimized parameters by using convolutional neural network model to determine the current status of the machine under test and analyze total anomaly probability corresponding to the data of the machine under test.

In an embodiment, the method comprises: when the model-assigning command dynamically assigns another damage alert machine-learning model that is different from the currently used damage alert machine-learning model, dynamically switching to the other damage alert machine-learning model to process the data of the machine under test to update the prediction of the anomaly probability.

The machine-learning based prognostic and health management system of the disclosure comprises: a machine sensor configured to dynamically receive data of a machine under test associated with operations of the machine under test; an instruction receiver configured to dynamically receive a model-assigning command; a processor configured to dynamically apply the damage alert machine-learning model corresponding to the model-assigning command to process the data of the machine under test to predict an anomaly probability of an anomaly occurrence of the machine under test, wherein the processor also dynamically generates, according to the anomaly probability, a damage possibility warning on the machine under test, and determine whether to keep the machine under test running or not; and an annunciator configured to inform, according to the damage possibility warning, the anomaly probability and a suggestion on whether to keep running; wherein the damage alert machine-learning model comprises a complete-life-cycle machine-training model, a failure-free machine-training model and a value-to-image machine-training model; wherein the complete-life-cycle machine-training model is based on the complete life cycle operation record of at least one machine, the failure-free machine-training model is based on the operation record of at least one failure-free machine, and the value-to-image machine-training model is based the analysis on images converted from values stored in an operation record of at least one machine.

In an embodiment, the processor comprises: a complete-life-cycle machine-learning module applying the complete-life-cycle machine-training model; a failure-free machine-learning module applying the failure-free machine-training model; and a value-to-image machine-learning module applying the value-to-image machine-training model; wherein the processor further dynamically assigns to use one of the complete-life-cycle machine-learning module, the failure-free machine-learning module and the value-to-image machine-learning module to dynamically apply the corresponding damage alert machine-learning model to process the data of the machine under test.

In an embodiment, the deep neural network model comprises a deep neural network model with low-rank decomposition.

In an embodiment, the complete-life-cycle machine-learning module comprises: a logistic regression module; a logical model module configured to perform, with the logistic regression module, low-rank decomposition to classify the data of the machine under test by applying a regression curve; a deep neural network module configured to establish, according to the data of the machine under test, a deep network mode and determine, according to the deep network model, current status of the machine under test and the corresponding anomaly probability.

In an embodiment, the failure-free machine-training model comprises a support vector data description model.

In an embodiment, the failure-free machine-learning module comprises: a frequency feature module; a temporal feature module configured to perform, with the frequency feature module, frequency domain and time domain operations on the data of the machine under test based on the frequency feature and the temporal feature of the data of the machine under test; and a support vector data description module configured to apply support vector data description to the data of the machine under test with the frequency domain and time domain operations performed to establish an optimization model to classify the anomaly probability in different data points of the data of the machine under test.

In an embodiment, the value-to-image machine-training model comprises a convolutional neural network model.

In an embodiment, the value-to-image machine-learning module comprises: an image data filtering and cutting module; a virtual abnormal data generating module configured to perform, with the image data filtering and cutting module, image data filtering and cutting and anomaly data generating on the data of the machine under test to convert the data of the machine under test to an image data, and extract eigenvalues of the image data according to an image feature of the image data to optimize parameters of the image data; and a convolutional neural network model module configured to analyze the image data having the optimized parameters by using the convolutional neural network model to determine the current status of the machine under test and analyze total anomaly probability corresponding to the data of the machine under test.

In an embodiment, when the model-assigning command dynamically assigns another damage alert machine-learning model different from the currently used damage alert machine-learning model, the processor is configured to dynamically switch to the other damage alert machine-learning model to process the data of the machine under test to update the prediction of the anomaly probability.

DETAILED DESCRIPTION OF THE PREFERRED EMBODIMENTS

Figure 1:
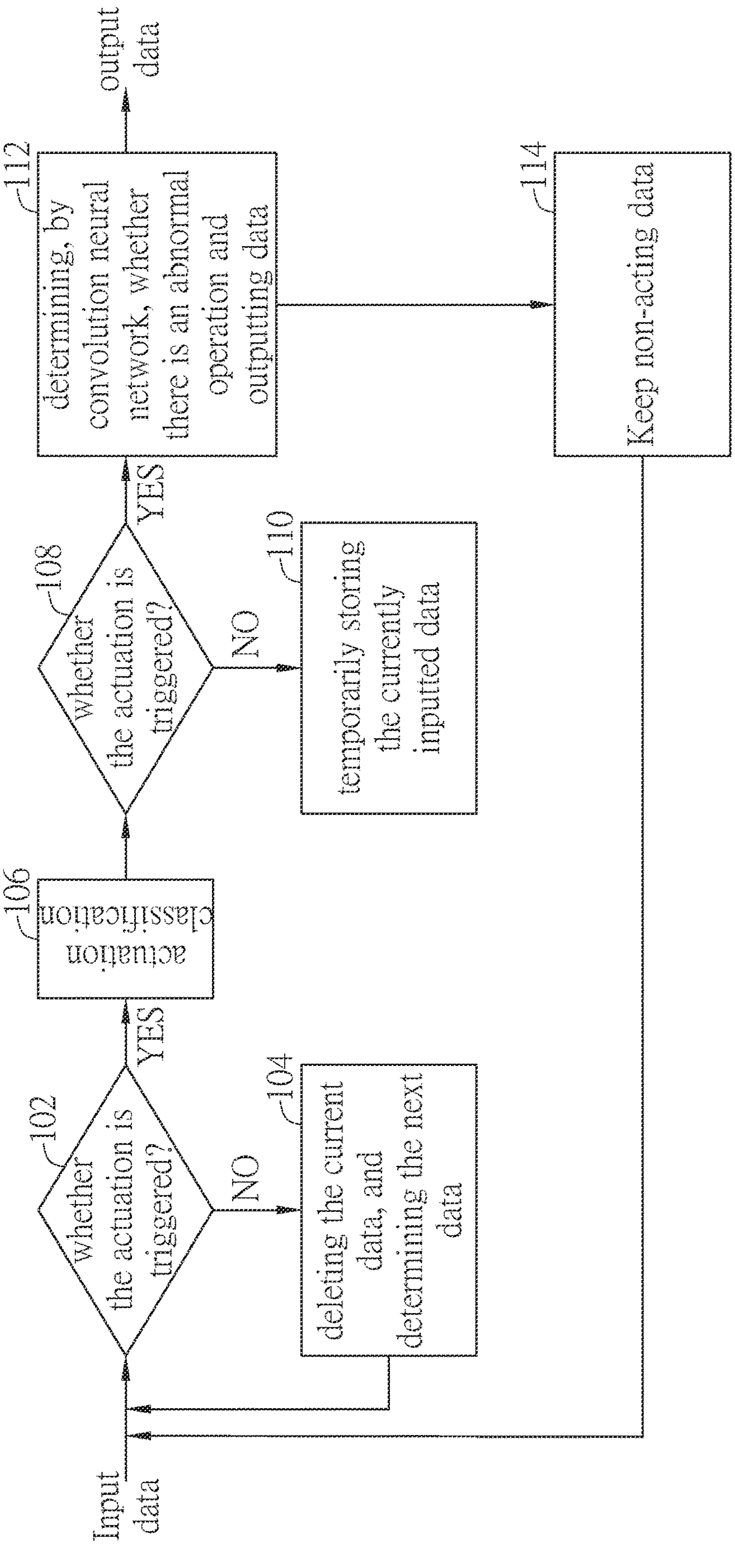
FIG. 1 (PRIOR ART)
FIG. 1 is a schematic flowchart of the implementation of the conventional prognostic and health management mechanism.

In order to solve the data processing problem caused by the conventional prognostic and health management mechanism, the disclosure provides a prognostic and health management method based on a machine-learning model to solve the problem of decreasing accuracy of failure prediction caused by insufficient time for merging and processing data when applying the conventional prognostic and health management mechanism. More specifically, the disclosure dynamically selects three types of damage alert machine-learning model with different trade-offs due to the difference in the completeness of data (that is, with different levels of information asymmetry and/or anomaly risks), or difference in data processing methodologies to predict the probability of anomaly of the machine under test and prepare for the anomaly according to the predicted probability. In this way, since a large number of analytical data can be classified and processed according to the difference in the completeness of data without stopping the operation of the machine under test, the data processing method can be customized and simplified under the most suitable conditions to reduce the burden of processing data, merging and establishing historical records, and solving the problems arising from the rapid merging of the large amount of data in the conventional technology.

Besides, the damage alert machine-learning model applied by the disclosure can include the complete-life-cycle machine-training model for monitoring the complete life cycle of the machine under test, the failure-free machine-training model under the assumption of operating under ideal conditions without considering failure conditions, and the value-to-image machine-training model which converts value to image for comparison. As mentioned above, the three machine-learning models can be applied to different levels of information asymmetry and/or corresponding risk of anomaly.

Because the complete-life-cycle machine-training model is derived from observing the complete life cycle of other machines, the characteristic of the complete-life-cycle machine-training model is that it has the most complete data amount and handles the most error conditions. In other words, the complete-life-cycle machine-training model is ideal for monitoring conditions under which damage is easy to occur. Conversely, in an environment less prone to damage, it is less efficient and more easily to produce redundant analytical data if only the complete-life-cycle machine-training model is applied. Therefore, the disclosure will select the complete-life-cycle machine-training model under the conditions of high information asymmetry and/or abnormal risk in the input data.

Because the failure-free machine-training model is established by observing the conditions of other machines that have never had failures, the characteristic of the failure-free machine-training model is that the data can be simplified and have better processing efficiency. However, contrary to the complete-life-cycle machine-training model, if only the failure-free machine-training model is used to monitor the machine, damages in many real situations may not be considered, and the rigor in monitoring will be relatively insufficient. Therefore, the disclosure will select the failure-free machine-training model where there is incomplete input data, that is, under close-to-ideal situations with low information asymmetry and/or abnormal risk.

Because the data processing method of the value-to-image machine-training model uses images converted from values as a unit for processing, including comparison, the value-to-image machine-training model is ideal for processing a large amount of block data inputting in a short time. The value-to-image machine-training model has the fastest processing speed among the above three machine-learning models. However, the monitoring rigor of the value-to-image machine-training model is not as good as the complete-life-cycle machine-training model. Hence, the disclosure will select the value-to-image machine-training model where there are massive input data and the need to simplify the input data as soon as possible for subsequent processing.

Due to the advantages and disadvantages of the above three machine-learning models, the prognostic and health management system and methods thereof of this disclosure will dynamically switch between the above three machine-learning models according to the input data to balance the impact caused by the advantages and disadvantages of the above three machine-learning models. Accordingly, the data processing rate and anomaly judgment accuracy are better than the conventional technologies.

Figure 2:
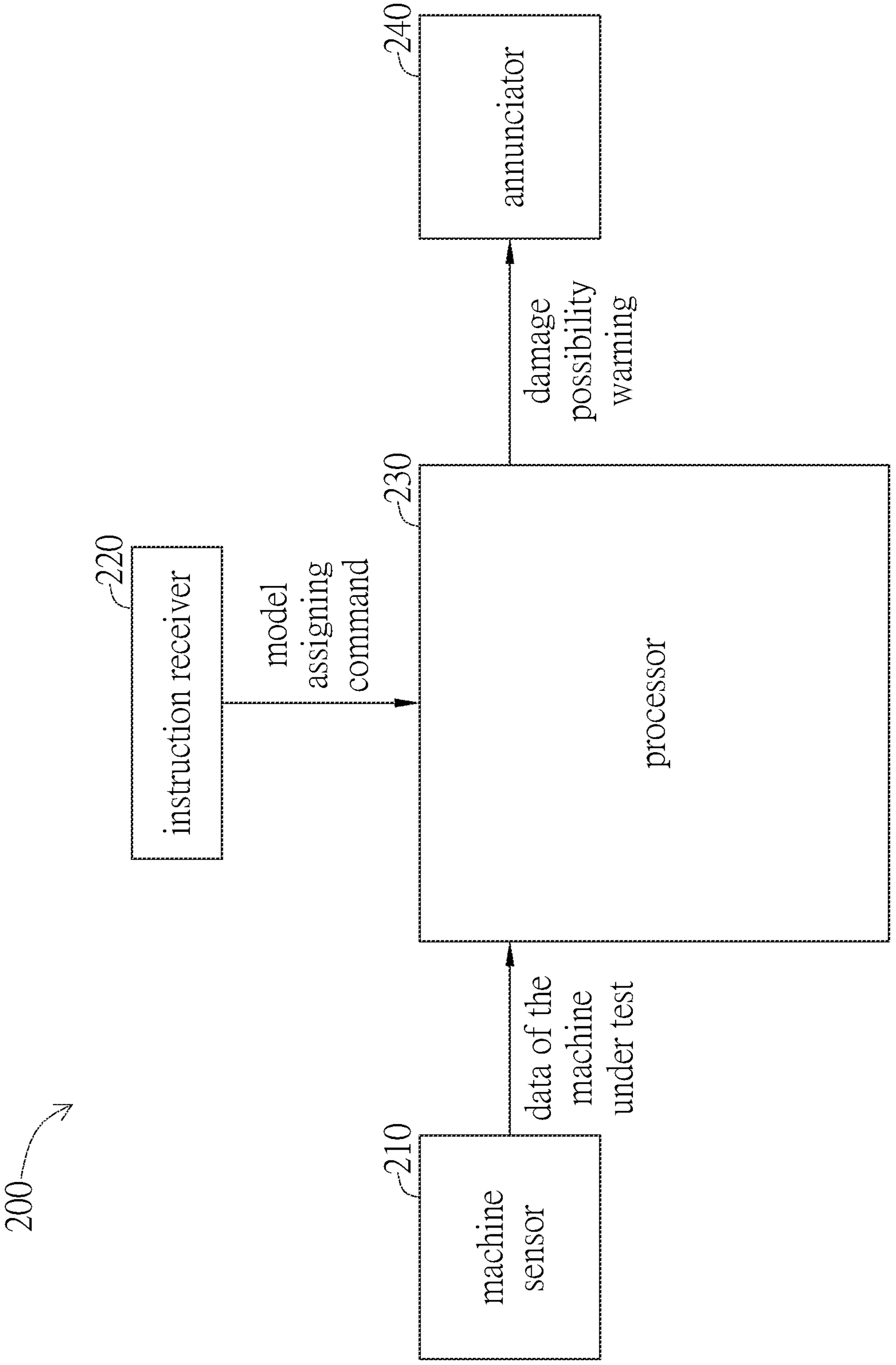
FIG. 2 is a schematic diagram of a prognostic and health management system based on a machine-learning model according to an embodiment of the disclosure.

Refer to FIG. 2. FIG. 2 is a schematic diagram of the machine-learning-model-based prognostic and health management system 200 according to an embodiment of the disclosure. The prognostic and health management system 200 comprises the machine sensor 210, the instruction receiver 220, the processor 230 and the annunciator 240.

The machine sensor 210 is configured to sense and generate the data of the machine under test formed by a plurality of monitoring parameters of the machine. The data of the machine under test will be dynamically inputted into the prognostic and health management system 200. The instruction receiver 220 is configured to dynamically receive the model-assigning command generated according to different conditions of the input data (for example, the level of information asymmetry and/or the occurrence rate of the input data). The processor 230 determines which damage alert machine model will be used according to the model-assigning command. The processor 230 is configured to execute the prognostic and health management method according to the disclosure. More specifically, the processor 230 dynamically switches, according to the model-assigning command received by the instruction receiver 220, between one of the three machine-learning models mentioned above in real time to process the current data of the machine under test. Therefore, the anomaly probability of the machine under test can be predicted for classification before merging the data (for example, classifying the data according to the level of anomaly probability). Besides, the processor 230 further dynamically generates the damage possibility warning on the machine under test according to the predicted anomaly probability to determine whether the machine under test should be kept running. For example, if the anomaly probability predicted by the processor 230 is higher than a critical anomaly probability, the processor 230 will issue the damage possibility warning mentioned above. Wherein the critical anomaly probability is varied according to different machine-learning models and/or different data of the machine under test, that is, the critical anomaly probability will be determined dynamically. If the anomaly probability predicted by the processor 230 is not higher than the critical anomaly probability, the processor 230 will not generate a damage possibility warning on the machine under test, or indicate a damage possibility warning within a range of safety probability. Then, the annunciator 240 will issue a warning according to the anomaly probability predicted by the processor 230, and suggest whether the machine under test should keep running according to its built-in response mechanism.

The prognostic and health management method executed by the processor 230 will comprise the damage alert machine-learning models mentioned above. The processor 230 can be installed with or have a complete-life-cycle machine-learning module 300, a failure-free machine-training module 400 and a value-to-image machine-learning module 500.

Figure 3:
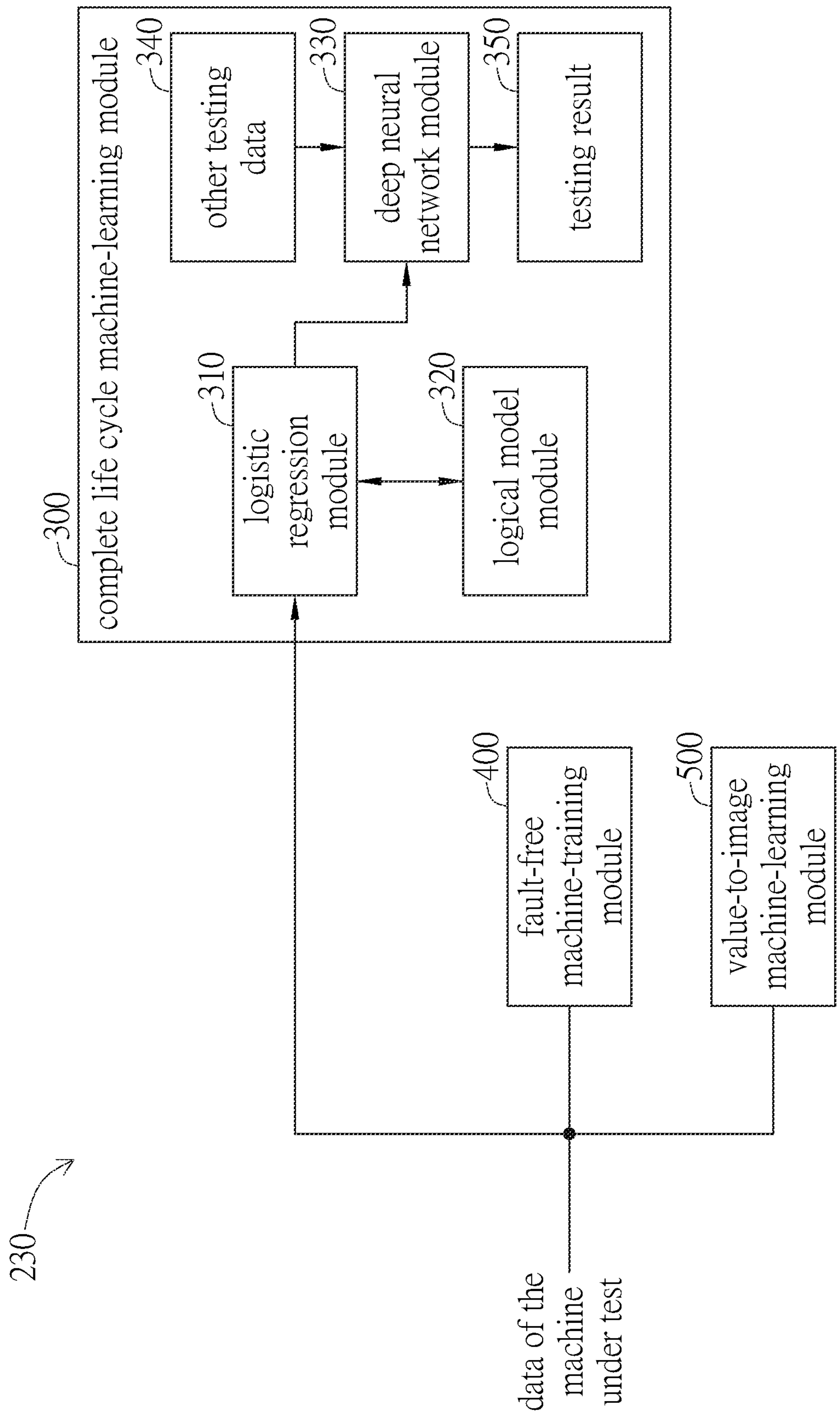
FIG. 3 is a schematic diagram showing the processor in FIG. 2 enabling the complete-life-cycle machine-learning module to apply the complete-life-cycle machine-learning model according to an embodiment of the disclosure.

As aforementioned, the damage alert machine-learning model according to the disclosure comprises a complete-life-cycle machine-training model. In an embodiment, the complete-life-cycle machine-training model can comprise the low-rank factorization (LRF) deep neural network (LRF DNN) model. Refer to FIG. 3. FIG. 3 is a schematic diagram where the processor 230 enables the complete-life-cycle machine-learning module 300 to apply the complete-life-cycle machine-learning model. The complete-life-cycle machine-learning module 300 comprises the logistic regression module 310, the logical model module 320 and the deep neural network module 330.

When the model-assigning command received by the instruction receiver 220 assigns the complete-life-cycle machine-training model, the processor 230 will select the complete-life-cycle machine-learning module 300 to process the data of the machine under test received by the machine sensor 210. The logistic regression module 310 and the logical model module 320 will cooperate with each other to perform a low-rank factorization to pre-classify the data of the machine under test by curve regression. Then, the deep neural network module 330 will establish the corresponding deep network model according to other testing data 340 (for example, the training data for machine-learning, or the non-actuation data accumulated prior to classification) and the classified data. Finally, the deep neural network module 330 generates testing result 350 as the basis of the damage possibility warning according to the current status of the machine under test determined by the deep network model and the relative anomaly probability.

As aforementioned, the advantage of choosing the complete-life-cycle machine-learning module 300 is that the prediction result is closest to the real damage circumstances that will occur in the machine under test, and has a certain degree of accuracy of prediction since the data for training the deep neural network is based on a complete life cycle.

Figure 4:
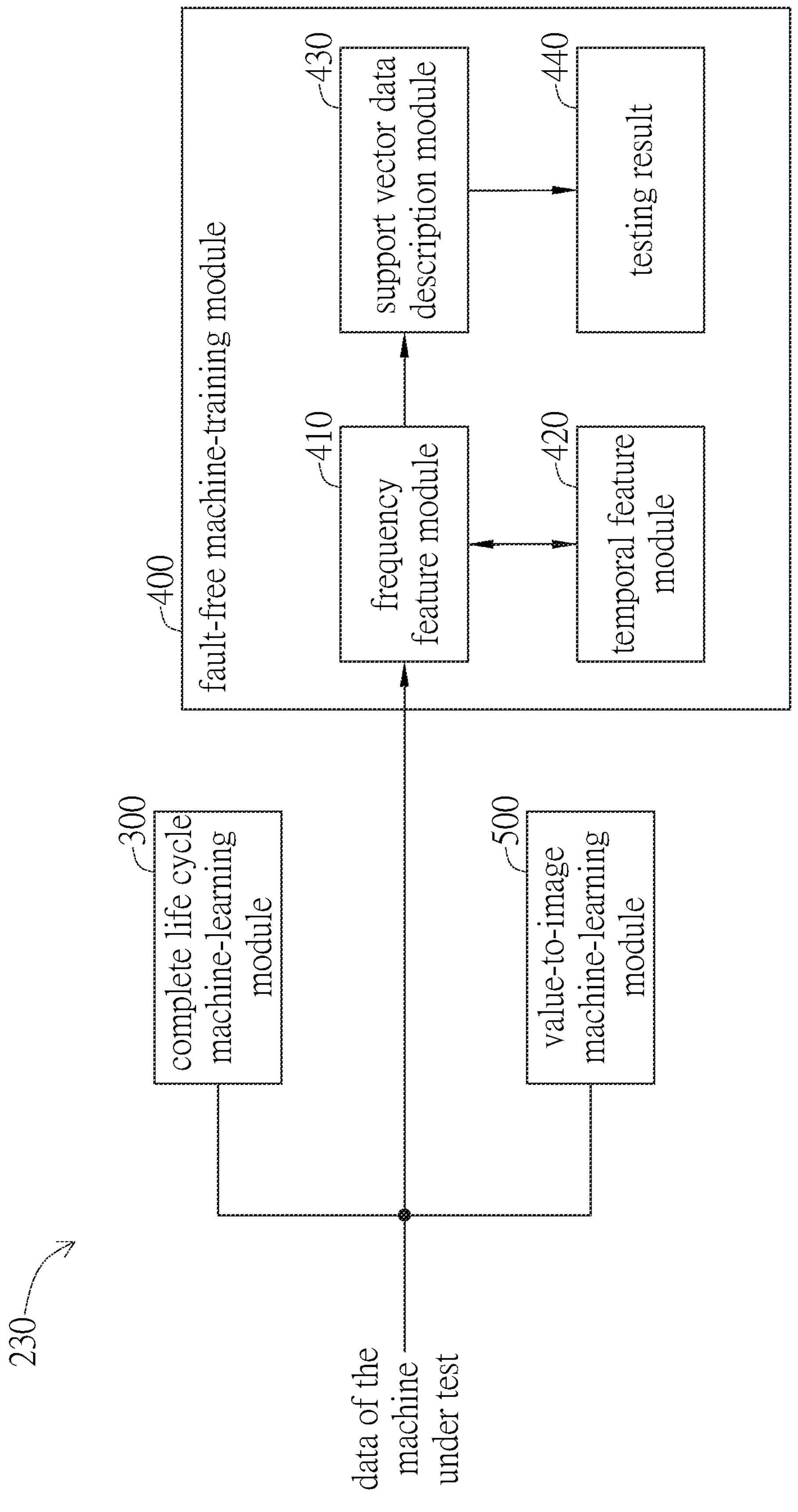
FIG. 4 is a schematic diagram showing the processor in FIG. 2 enabling the failure-free machine-training module adopting the failure-free machine-training model according to an embodiment of the disclosure.

Moreover, the damage alert machine-learning model according to the disclosure comprises a failure-free machine-training model. In an embodiment of the disclosure, a failure-free machine-training model further comprises a support vector data description (SVDD) model. Refer to FIG. 4. FIG. 4 is a schematic diagram where the processor 230 enables the failure-free machine-training module 400 to adopt a failure-free machine-training model. The failure-free machine-training module 400 comprises the frequency feature module 410, the temporal feature module 420 and the support vector data description module 430.

When the model-assigning command received by the instruction receiver 220 assigns the failure-free machine-training model, the processor 230 will select the failure-free machine-training module 400 to process the data of the machine under test received by the machine sensor 210. The frequency feature module 410 and the temporal feature module 420 will perform certain level of frequency domain and time domain operations on the data of the machine under test. Then, the support vector data description module 430 will do the final processing. In an embodiment, the support vector data description module 430 may project the data for training to a high-dimension space to establish an optimization model with hypersphere shape. The optimization model includes most of the training data and has the smallest volume. In the end, the data of the machine under test will be classified into different regions of anomaly probability representing, respectively, normal, alert and extremely abnormal conditions according to the optimization model. In addition, during the procedure of establishing the optimization model, the support vector data description module 430 will learn the boundary for decision making based on the normal data (data with lower anomaly probability), and determine whether the new input data point is beyond the boundary of the hypersphere according to the boundary for decision making. The data point beyond the boundary of the hypersphere will be determined as the data point of higher anomaly probability. In the end, the support vector data description module 430 will output the testing result 440 according to the data classified by the anomaly probability. The testing result 440 will be treated as the basis of the damage possibility warning. The advantage of the failure-free machine-training model is that the output data is relatively simple and easy to process. Hence, the data merging rate will be increased.

Figure 5:
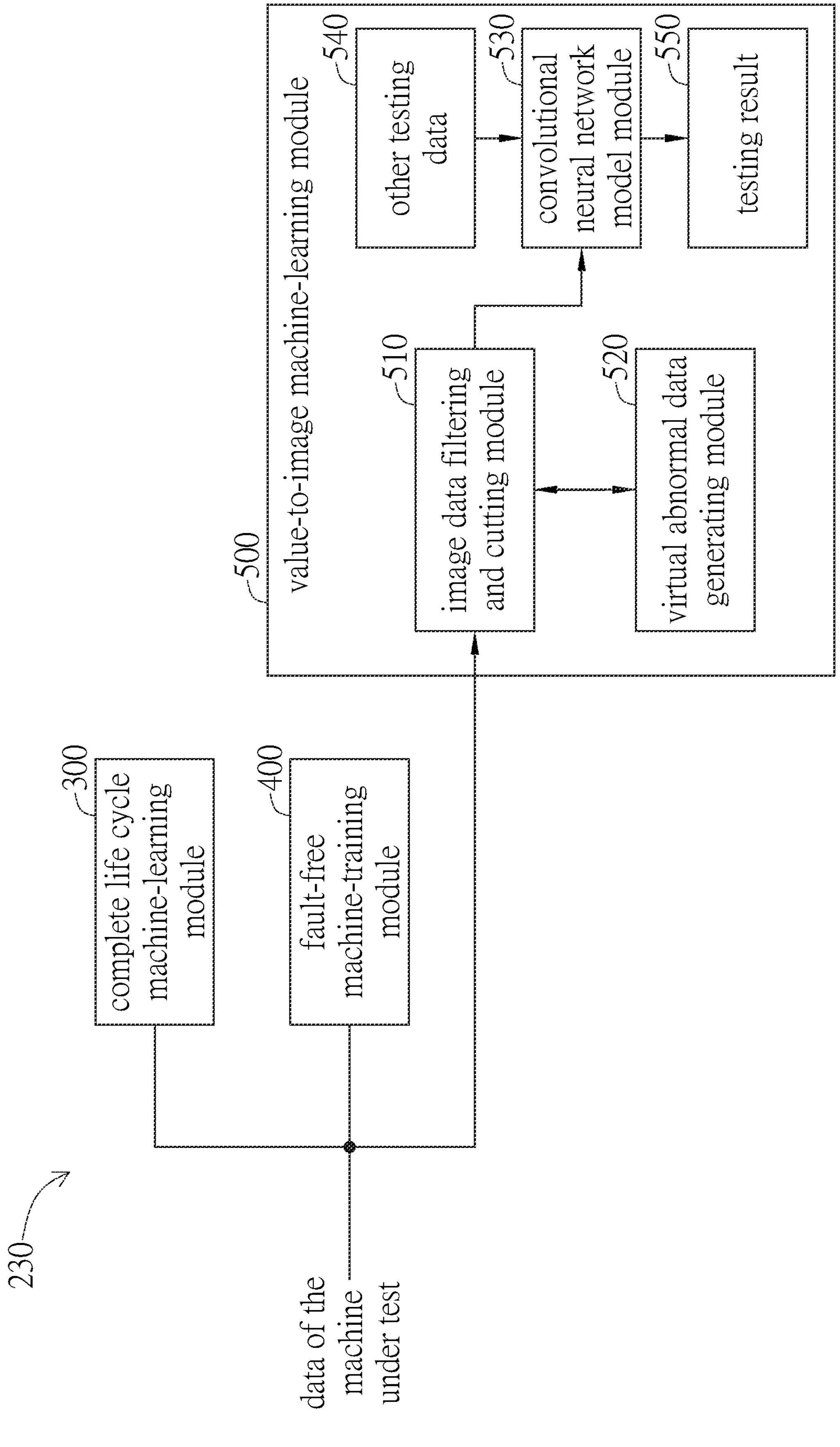
FIG. 5 is a schematic diagram showing the processor in FIG. 2 enabling the value-to-image machine-learning module adopting the value-to-image machine-training model according to an embodiment of the disclosure.

Finally, the damage alert machine-learning model according to the present disclosure comprises a value-to-image machine-training model. In an embodiment, the value-to-image machine-training model further comprises the convolution neural network (CNN) model. Refer to FIG. 5. FIG. 5 is a schematic diagram where the processor 230 enables the value-to-image machine-learning module 500 to adopt a value-to-image machine-training model. The value-to-image machine-learning module 500 comprises the image data filtering and cutting module 510, virtual abnormal data generating module 520 and the convolutional neural network model module 530.

When the model-assigning command received by the instruction receiver 220 assigns the value-to-image machine-training model, the processor 230 will select the value-to-image machine-learning module 500 to process the data of the machine under test received by the machine sensor 210. The image data filtering and cutting module 510 will work with the virtual abnormal data generating module 520 first to convert the data of the machine under test to an image data, and extract the eigenvalues of the image data according to an image characteristic of the image data. The eigenvalues of the image data will be the basis for determining whether the data of the machine under test is abnormal (for example, determining the abnormal occurrence probability of each data point). During the procedure, the data of the machine under test will be optimized. Therefore, a more accurate judgment can be made based on the erroneous judgments for the past image data. And then, the convolutional neural network model module 530 will analyze the image data which have been optimized and the other testing data 540 (for example, the training data for machine-learning) to determine the current status of the machine under test and the anomaly probability corresponding to the total data. The testing result 550 will be produced as the basis of the damage possibility warning.

As aforementioned, after converting the data of the machine under test to image data, the eigenvalues extracted from the image data can be used to determine whether abnormality occurred or not. Therefore, the amount of data to be processed will decrease. The chances for feature identification failure can also be avoided with the support of the data that has gone through image identification.

Figure 6:
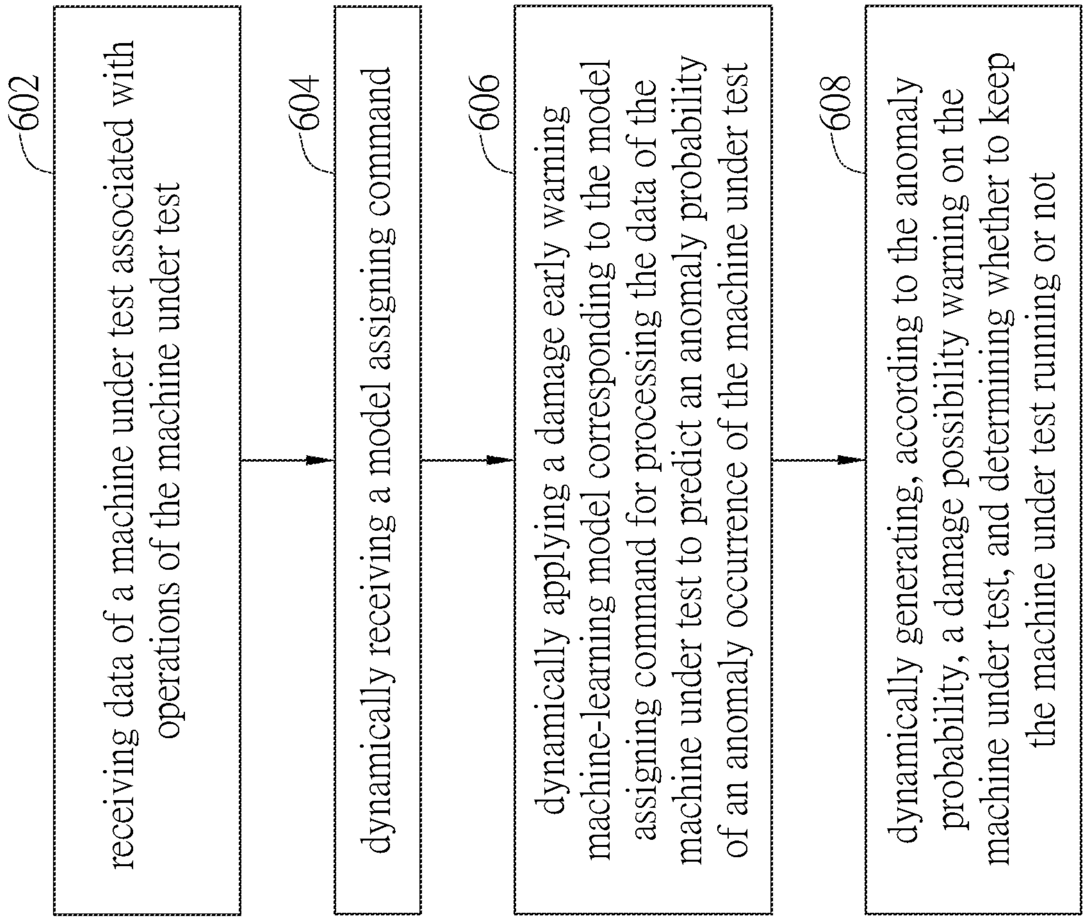
FIG. 6 illustrates the flowchart of a prognostic and health management method based on a machine-learning model.

FIG. 6 illustrates the flowchart of a machine-learning-model-based prognostic and health management method. The main steps in the flowchart are similar to the prognostic and health management system 200 mentioned above. Therefore, the detailed description will be omitted. The flowchart comprises the following steps.

Step 602: receiving data of a machine under test associated with operations of the machine under test;

Step 604: dynamically receiving a model-assigning command;

Step 606: dynamically applying a damage alert machine-learning model corresponding to the model-assigning command for processing the data of the machine under test to predict an anomaly probability of an anomaly occurrence of the machine under test; and Step 608: dynamically generating, according to the anomaly probability, a damage possibility warning on the machine under test, and determining whether to keep the machine under test running or not.

Accordingly, the machine-learning-model-based prognostic and health management system and methods thereof in the disclosure are mainly to solve the problem of insufficient time for processing and merging data caused by huge amount of data and a fast data generating rate, which in turn affects the accuracy of alert. The means adopted in the disclosure is to dynamically switch between damage alert machine-learning models in response to different anomaly probabilities.

What is claimed is:

1. A machine-learning based prognostic and health management method, comprising:

receiving, by a sensor, data of a machine under test associated with operations of the machine under test;

determining, by a processor, a model-assigning condition for generating a model-assigning command, wherein the model-assigning command is generated based on at least one of a level of information asymmetry and an occurrence rate of the data of the machine under test;

receiving, by an instruction receiver, the model-assigning command;

applying, by the processor, a damage alert machine-learning model corresponding to the model-assigning command for processing the data of the machine under test to determine an anomaly probability of an anomaly occurrence of the machine under test; and dynamically generating, by an annunciator and according to the anomaly probability, a damage possibility warning on the machine under test, and determining, by the processor, whether to keep the machine under test running or not, wherein the damage alert machine-learning model comprises a complete-life-cycle machine-training model, a failure-free machine-training model and a value-to-image machine-training model;

wherein the complete-life-cycle machine-training model is based on a complete life cycle operation record of at least one machine, the failure-free machine-training model is based on an operation record of at least one failure-free machine, and the value-to-image machine-training model is based analysis on images converted from values stored in an operation record of at least one machine;

wherein the complete-life-cycle machine-training model is selected under a first condition of the model-assigning condition; wherein the failure-free machine-training model is selected under a second condition of the model-assigning condition; wherein the first condition includes a first level of the information asymmetry; the second condition includes a second level of the information asymmetry; and wherein the first level is higher than the second level; and wherein the value-to-image machine-training model is selected under a third condition of the model-assigning condition, wherein the third condition corresponds to an input data amount larger than that of the first condition or the second condition.

2. The method of claim 1, wherein the complete-life-cycle machine-training model comprises a low-rank factorization deep neural network model.

3. The method of claim 2, wherein applying the damage alert machine-learning model corresponding to the model-assigning command for processing the data of the machine under test to predict the anomaly probability of the anomaly occurrence of the machine under test, comprises:

applying logistic regression and logical model for performing low-rank factorization to classify the data of the machine under test by applying a regression curve;

applying deep neural network to establish a deep network model; and applying the deep network model to determine current status of the machine under test and corresponding anomaly probability.

4. The method of claim 1, wherein the failure-free machine-training model comprises support vector data description model.

5. The method of claim 1, wherein applying the damage alert machine-learning model corresponding to the model-assigning command for processing the data of the machine under test to predict the anomaly probability of the anomaly occurrence of the machine under test, comprises:

performing frequency domain and time domain operations on the data of the machine under test based on a frequency feature and a temporal feature of the data of the machine under test; and applying support vector data description to the data of the machine under test with the frequency domain and time domain operations performed to establish an optimization model to classify the anomaly probability in different data points of the data of the machine under test.

6. The method of claim 1, wherein the value-to-image machine-training model comprises convolutional neural network model.

7. The method of claim 1, wherein applying the damage alert machine-learning model corresponding to the model-assigning command for processing the data of the machine under test to predict the anomaly probability of the anomaly occurrence of the machine under test, comprises:

performing processes of image data filtering and cutting, and anomaly data generating on the data of the machine under test to convert the data of the machine under test to an image data;

extracting eigenvalues of the image data according to an image feature of the image data to optimize parameters of the image data; and analyzing the image data having the optimized parameters by using convolutional neural network model to determine current machine under test status and analyze total anomaly probability corresponding to the data of the machine under test.

8. The method of claim 1, wherein applying the damage alert machine-learning model corresponding to the model-assigning command for processing the data of the machine under test to predict the anomaly probability of the anomaly occurrence of the machine under test, comprises: when the model-assigning command assigns another damage alert machine-learning model different from the currently used damage alert machine-learning model, switching to the another damage alert machine-learning model for processing the data of the machine under test to update the prediction of the anomaly probability.

9. A machine-learning based prognostic and health management system, comprising:

a machine sensor configured to receive data of a machine under test associated with operations of the machine under test;

an instruction receiver configured to receive a model-assigning command generated based on at least one of a level of information asymmetry and an occurrence rate of the data of the machine under test;

a processor configured to determine a model-assigning condition for generating the model-assigning command and apply a damage alert machine-learning model corresponding to the model-assigning command for processing the data the machine under test to predict an anomaly probability of an anomaly occurrence of the machine under test, the processor also generates, according to the anomaly probability, a damage possibility warning on the machine under test, and determine whether to keep the machine under test running or not; and an annunciator configured to inform, according to the damage possibility warning, the anomaly probability;

wherein the processor is further configured to determine whether to keep running the machine under test;

wherein the damage alert machine-learning model comprises a complete-life-cycle machine-training model, a failure-free machine-training model and a value-to-image machine-training model;

wherein the complete-life-cycle machine-training model is based on a complete life cycle operation record of at least one machine, the failure-free machine-training model is based on an operation record of at least one failure-free machine, and the value-to-image machine-training model is based analysis on images converted from values stored in an operation record of at least one machine;

wherein the complete-life-cycle machine-training model is selected under a first condition of the model-assigning condition; wherein the failure-free machine-training model is selected under a second condition of the model-assigning condition; wherein the first condition includes a first level of the information asymmetry; the second condition includes a second level of the information asymmetry; and wherein the first level is higher than the second level; and wherein the value-to-image machine-training model is selected under a third condition of the model-assigning condition, wherein the third condition corresponds to an input data amount larger than that of the first condition or the second condition.

10. The prognostic and health management system of claim 9, wherein the processor comprises:

a complete-life-cycle machine-learning module applying the complete-life-cycle machine-training model;

a failure-free machine-learning module applying the failure-free machine-training model; and a value-to-image machine-learning module applying the value-to-image machine-training model;

wherein the processor further assigns to use one of the complete-life-cycle machine-learning module, the failure-free machine-learning module and the value-to-image machine-learning module to apply the corresponding damage alert machine-learning model for processing the data of the machine under test.

11. The prognostic and health management system of claim 10, wherein the deep neural network model comprises a low-rank factorization deep neural network model.

12. The prognostic and health management system of claim 11, wherein the complete-life-cycle machine-learning module comprises:

a logistic regression module;

a logical model module configured to perform, with the logistic regression module, low-rank factorization to classify the data of the machine under test by applying a regression curve;

a deep neural network module configured to establish, according to the data of the machine under test, a deep network mode and determine, according to the deep network model, current status of the machine under test and corresponding anomaly probability.

13. The prognostic and health management system of claim 10, wherein the failure-free machine-training model comprises support vector data description model.

14. The prognostic and health management system of claim 13, wherein the failure-free machine-learning module comprises:

a frequency feature module;

a temporal feature module configured to perform, with the frequency feature module, frequency domain and time domain operations on the data of the machine under test based on a frequency feature and a temporal feature of the data of the machine under test; and a support vector data description module configured to apply support vector data description to the data of the machine under test with the frequency domain and time domain operations performed to establish an optimization model to classify the anomaly probability in different data points of the data of the machine under test.

15. The prognostic and health management system of claim 10, wherein the value-to-image machine-training model comprises a convolutional neural network model.

16. The prognostic and health management system of claim 15, wherein the value-to-image machine-learning module comprises:

an image data filtering and cutting module;

a virtual abnormal data generating module configured to perform, with the image data filtering and cutting module, process of image data filtering and cutting and anomaly data generating on the data of the machine under test to convert the data of the machine under test to an image data, and extract eigenvalues of the image data according to an image feature of the image data to optimize parameters of the image data;

and a convolutional neural network model module configured to analyze the image data having the optimized parameters by using the convolutional neural network model to determine current machine under test status and analyze total anomaly probability corresponding to the data of the machine under test.

17. The prognostic and health management system of claim 10, when the model-assigning command dynamically assigns another damage alert machine-learning model different from the currently used damage alert machine-learning model, the processor is configured to dynamically switch to the another damage alert machine-learning model for processing the data of the machine under test to update the prediction of the anomaly probability.

* * * * *